United States Patent
Ganz et al.

(10) Patent No.: US 10,099,126 B2
(45) Date of Patent: Oct. 16, 2018

(54) SYNCHRONIZING SYSTEM FOR GAMEPLAYING

(71) Applicant: Ganz, Woodbridge (CA)

(72) Inventors: Howard Ganz, North York (CA); Karl Joseph Borst, Woodbridge (CA); John Alexander Larsen, Toronto (CA)

(73) Assignee: GANZ, Woodbridge, Ontario ( * ) Notice: Subject to any disclaimer, the term of this patent is extended or adjusted under 35 U.S.C. 154(b) by 0 days.

(21) Appl. No.: 15/694,198

(22) Filed: Sep. 1, 2017

(65) Prior Publication Data

US 2017/0361227 A1 Dec. 21, 2017

Related U.S. Application Data

(62) Division of application No. 13/343,955, filed on Jan. 5, 2012, now Pat. No. 9,782,674.

(60) Provisional application No. 61/430,713, filed on Jan. 7, 2011.

(51) Int. Cl.
| | |
|---|---|
| *A63F 13/335* | (2014.01) |
| *A63F 13/332* | (2014.01) |
| *A63F 13/71* | (2014.01) |
| *A63F 13/35* | (2014.01) |

(52) U.S. Cl.
CPC .......... *A63F 13/335* (2014.09); *A63F 13/332* (2014.09); *A63F 13/35* (2014.09); *A63F 13/71* (2014.09); *A63F 2300/406* (2013.01); *A63F 2300/407* (2013.01)

(58) Field of Classification Search
CPC ................................................ H04L 29/06034
See application file for complete search history.

(56) References Cited

U.S. PATENT DOCUMENTS

| | | |
|---|---|---|
| 5,768,382 A | 6/1998 | Schneier et al. |
| 5,892,900 A | 4/1999 | Ginter et al. |
| 5,970,143 A | 10/1999 | Schneier et al. |
| 6,119,229 A | 9/2000 | Martinez et al. |
| 6,267,672 B1 | 7/2001 | Vance |
| 6,468,155 B1 | 10/2002 | Zucker et al. |
| 6,616,532 B2 | 9/2003 | Albrecht |
| 6,663,105 B1 | 12/2003 | Sullivan et al. |
| 6,758,746 B1 | 7/2004 | Hunter et al. |
| 6,920,567 B1 | 7/2005 | Doherty et al. |
| 7,000,104 B2 | 2/2006 | Shimada |
| 7,120,604 B2 | 10/2006 | Maari |
| 7,266,522 B2 | 9/2007 | Dutta et al. |
| 7,278,165 B2 | 10/2007 | Molaro |
| 7,310,732 B2 | 12/2007 | Matsuyama et al. |

(Continued)

FOREIGN PATENT DOCUMENTS

| | | |
|---|---|---|
| GB | 2365364 | 2/2002 |
| JP | 2002063092 | 2/2002 |

*Primary Examiner* — Jay Liddle
*Assistant Examiner* — Alex F. R. P. Rada, II
(74) *Attorney, Agent, or Firm* — Pearne & Gordon LLP (57) ABSTRACT

The subject application describes an activity performed with or without a website, such as a game. The game can be played either when in contact with the website or when disconnected from the website. The game playing can be carried out for example on a mobile device. The game can be used to earn virtual cash on the website, when playing from the mobile device. The game can also be played when the mobile device is not attached to the website, in which case the points that are received are saved along with an encryption to avoid a user's improper increasing of the points.

10 Claims, 6 Drawing Sheets

(56) References Cited

U.S. PATENT DOCUMENTS

| | | |
|---|---|---|
| 7,314,407 B1 | 1/2008 | Pearson |
| 7,461,264 B2 | 12/2008 | Chen |
| 7,465,212 B2 | 12/2008 | Ganz |
| 7,469,232 B2 | 12/2008 | Read |
| 7,548,242 B1 | 6/2009 | Hughes |
| 7,556,563 B2 | 7/2009 | Ellis et al. |
| 7,636,691 B2 | 12/2009 | Maari |
| 7,716,136 B2 | 5/2010 | Read |
| 7,720,766 B2 | 5/2010 | Sakamoto |
| 2001/0047340 A1 | 11/2001 | Snow et al. |
| 2002/0068629 A1 | 6/2002 | Allen |
| 2003/0004889 A1 | 1/2003 | Fiala |
| 2003/0177347 A1 | 9/2003 | Schneier et al. |
| 2003/0220885 A1 | 11/2003 | Lucarelli et al. |
| 2004/0193489 A1 | 9/2004 | Boyd et al. |
| 2005/0059483 A1 | 3/2005 | Borge |
| 2005/0114272 A1 | 5/2005 | Herrmann et al. |
| 2005/0235156 A1 | 10/2005 | Chen |
| 2006/0080539 A1 | 4/2006 | Asami et al. |
| 2006/0093142 A1 | 5/2006 | Schneier et al. |
| 2006/0121992 A1 | 6/2006 | Bortnik |
| 2007/0082720 A1 | 4/2007 | Bradbury |
| 2008/0126223 A1 | 5/2008 | Chatani |
| 2008/0163379 A1 | 7/2008 | Robinson et al. |
| 2008/0261687 A1 | 10/2008 | Gatzios |
| 2009/0070198 A1 | 3/2009 | Berger |
| 2009/0131164 A1 | 5/2009 | Ganz |
| 2009/0132357 A1 | 5/2009 | Ganz |
| 2009/0132656 A1 | 5/2009 | Ganz |
| 2009/0156310 A1 | 6/2009 | Fargo |
| 2009/0240659 A1 | 9/2009 | Ganz et al. |
| 2009/0248544 A1 | 10/2009 | Ganz |
| 2009/0307609 A1 | 12/2009 | Ganz et al. |
| 2010/0151940 A1 | 6/2010 | Borge |
| 2011/0118009 A1 | 5/2011 | Bone |
| 2012/0021822 A1 | 1/2012 | DeWaal |
| 2012/0116552 A1 | 5/2012 | Jennings |

SYNCHRONIZING SYSTEM FOR GAMEPLAYING

This application is a Divisional of U.S. patent application Ser. No. 13/343,955 filed on Jan. 5, 2012, which claims priority to Provisional Application No. 61/430,713, filed Jan. 7, 2011, all are incorporated herein by reference in their entirety.

BACKGROUND

GANZ markets a product which includes both real-world items, and their virtual replicas. Webkinz® stuffed animals allow obtaining both a stuffed animal or other "pet" and a virtual representation of the pet on a website. Techniques of the website and user interaction are described in patent application publication number 2005-0177428, the subject matter of which is herewith incorporated by reference.

In one embodiment of use of the Ganz system, as used in the "Webkinz®" website, a unique registration code is associated with the toy or other item, and that registration code opens content on the website when entered on the website. The content that is opened has an appearance that resembles the toy.

A user can carry out various virtual activities on the website. When the user carries out these activities, they receive points that can be used within the activities of the website. For example, one way in which these points can be used is to buy items for an item that is registered, e.g., a virtual pet. The items can be used to customize the pet. In one embodiment, the points are used as virtual cash.

The points that are awarded can also or alternatively be used for other purposes.

SUMMARY

An embodiment is described that allows interacting with a game's primary website and playing a game either when in contact with the game's primary website or when disconnected from the game's primary website. The game playing can be carried out for example on a mobile device. In one instance, the game can be a massively multiplayer online (MMO) game hosted on the game's primary website.

In one embodiment, a remote version of the game or activity can be resident on the mobile device. Playing the game on the mobile device when connected (e.g., logged on) to the website causes the score on the website to increase. Hence, this can be used to earn virtual cash on the website, when playing from the mobile device.

The game can also be played when the mobile device is not connected to the website, in which case the points that are earned are saved along with an encryption to avoid a user's improper increasing of the points or other tampering or misuse of the points.

In another embodiment, third party websites may have different versions of the game or different games that are related to the MMO game, for example, all of which permit earning points, tokens and the like for later use or to advance further play on the game's primary website.

DETAILED DESCRIPTION

Figure 1:
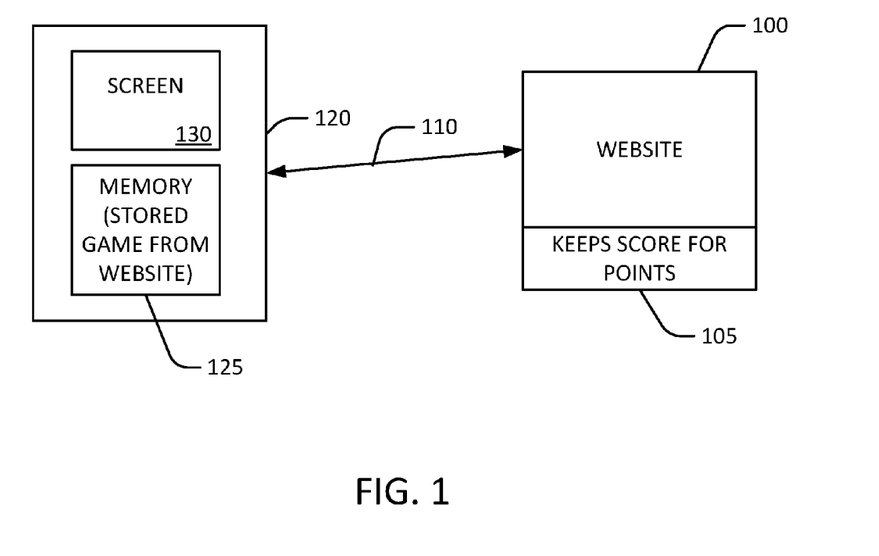
FIG. 1 shows a system diagram of the game being played on a website.

FIG. 1 illustrates an embodiment. A website 100 can be a conventional website running on a computer server, which allows one or many people to connect to the website and carry out actions on the website, including conventional website activities. The conventional website activities can include, for example, interacting with a user's virtual pets, registering new pets associated with a user account, and carrying out activities which can gain points or virtual currency on the website.

In one embodiment, the user can register a virtual product on the website by entering a code on the client computer that is indicative of the product. The code may be for example a unique code. The unique code is entered on the client computer, and information indicative of that code is communicated to the server computer. The server computer then registers a virtual product e.g., a virtual pet that is based on said code. The registration may be carried out in conjunction with a user account. Following therefrom, that virtual product may be displayed on the website during the activity, e.g., during playing of the game. In one embodiment, the user can also customize the virtual product e.g., by buying clothing or otherwise changing the look of the virtual product. In one embodiment, the customized virtual product is shown as part of the playing of the game, and points can be obtained for playing the game. Those points can be used to buy things for the product and hence further customize the virtual product.

In one embodiment, the virtual product can be animated during the playing of the game, e.g. the virtual product or customized virtual product may be part of the game itself The website 100 keeps a score of points shown generically as 105. The website can be the Webkinz® website operated by Ganz®. In another embodiment, there can be alternative web versions of the games—e.g., a social networking website version of the games that can be played on a social networking website including but not limited to the Facebook® website to obtain points for transfer to and to earn other rewards on the Webkinz® website.

The website 100 communicates with any of a number of devices 120 which are connected thereto via a publicly available network 110, e.g. the Internet. In this embodiment, the device 120 is a mobile device such as a mobile phone (e.g., including but not limited to an iPhone® and a smart phone). Other types of mobile devices include but are not limited to mobile media players (e.g. iPod®), tablet computers, laptops, netbooks, etc. The public network connection may be provided via a wireless connection, such as via so-called WIFI (i.e. IEEE 802.11), a cellular data connection, or the like. Alternatively, the network may be provided via a wired connection, such as Ethernet, USB, or the like.

Some versions of the game may be mobile versions, intended to be played on the mobile device 120. Those versions of the game can be downloaded from the website 100 (or from another authorized website not shown in the figure) and stored in the memory 125 of the mobile device 120. This enables the games to be played locally on the mobile device 120. When the games are played locally, they are played as conventional with actions occurring on the screen 130.

Figure 2:
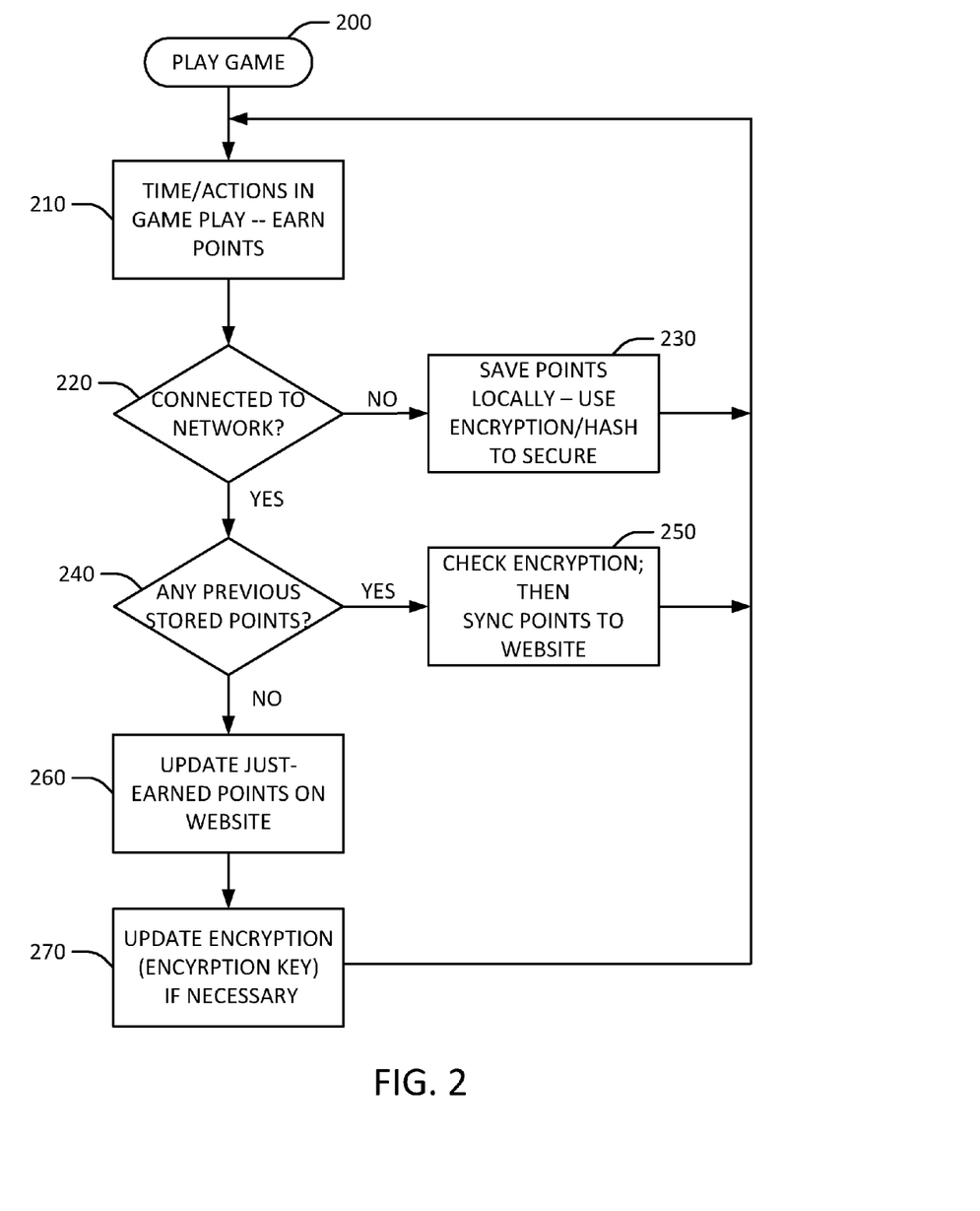
FIG. 2 shows a flowchart of operation of the game as carried out on a device.

The game is played as described by the flow diagram in FIG. 2, starting at 200. At 200, the user initiates play of the game on a mobile device (e.g., see mobile device 120 in FIG. 1).

At 210, as the game is played on the mobile device, the user earns points according to the standard rules of the particular game. For example, the game may be a game in which as items are found, a certain number of points are collected by the user. The points can be used on the website 100 for some action, for example as virtual currency. In particular, the points may be converted to virtual currency to buy items on the website or they can be accumulated on the website for some other purpose.

Figure 3A:
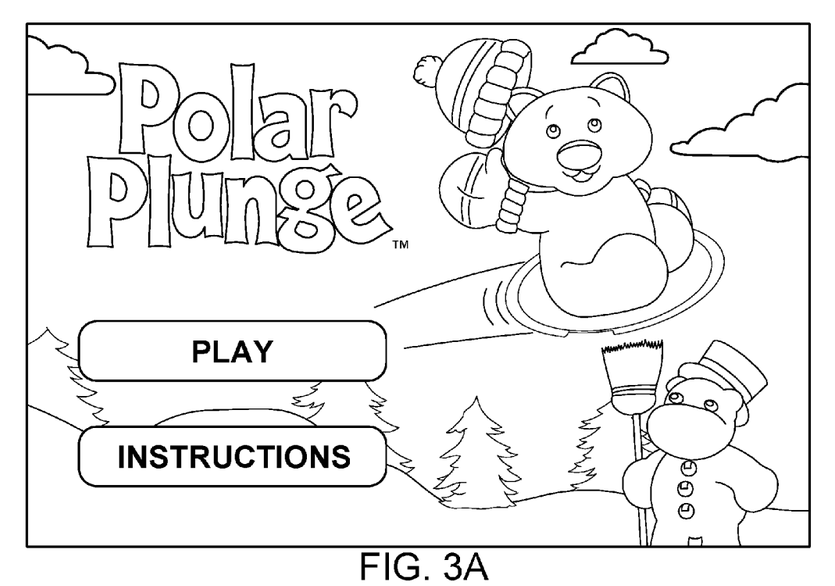
FIGS. 3A-3H show an exemplary game that is provided on a mobile device which can be accessed via a website or as a standalone application downloaded from the website and stored locally on the device.
Figure 3B:
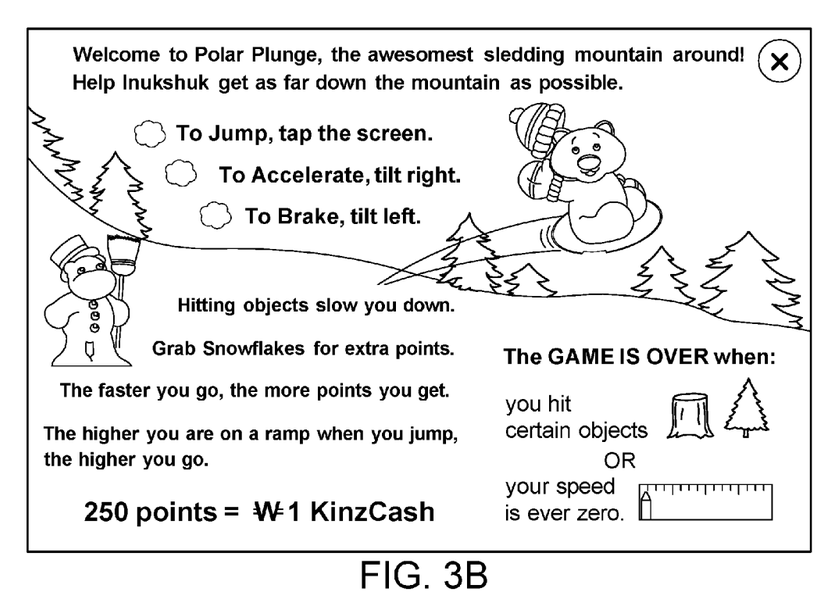
Figure 3C:
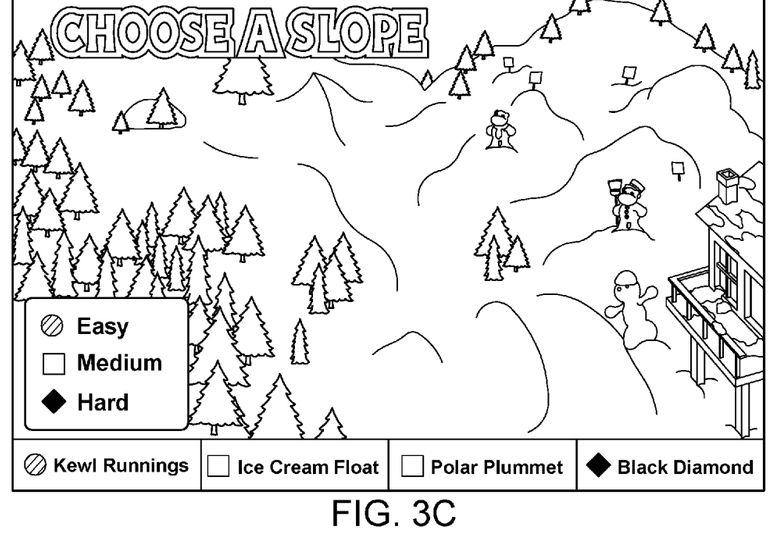
Figure 3D:
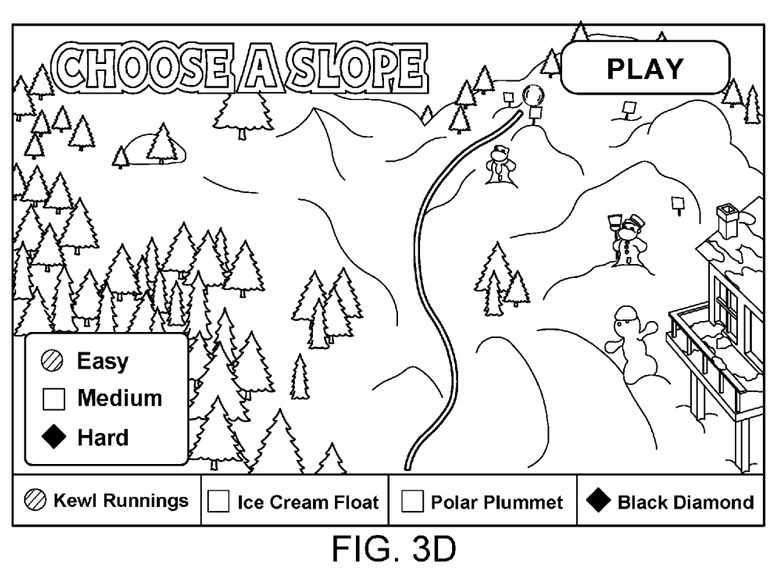
Figure 3E:
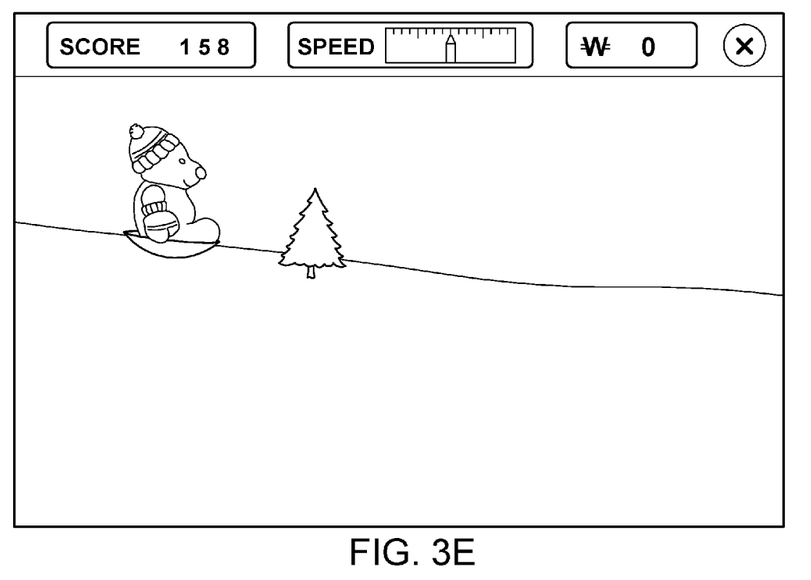

For example, as shown in the example embodiment of FIGS. 3A-3H, a game called Polar Plunge™ is provided on a mobile device 120 utilizing the iOS operating system, such as an iPhone® or iPod®. The game can be purchased as a stand-alone application or "app" through iOS's built-in AppStore™ app. After the game is purchased and downloaded onto the mobile device 120, it is played offline. FIG. 3A shows the opening screen, where the user has the opportunity to either play the game or receive instructions for playing. As shown and described in FIGS. 3B-3E, the game involves navigating the image of a polar bear down a mountain on a sled while avoiding obstacles. By keeping the polar bear from crashing for a predetermined period of time, the user earns points, which may have an equivalent value in virtual currency. For example, as shown in FIG. 3B, 250 points in the game are worth 1 unit of virtual currency or KinzCash™.

As mentioned above, social networking website or other third party websites can offer such games which are tied into the MMO or primary version of the game, for example. This means that users in the third party website game (e.g., website version of game on Facebook®) have the ability to win prizes that can only be used in the primary game (e.g., MMO game). As well, a Facebook® user is given the chance to complete collections within the Facebook® game that can unlock prizes in both Facebook® and the MMO game. While most of the collectables can be found through playing the third party version of the game, some will only be able to be found within the MMO game. Finally, users of the third party website game that indicate that they also have an MMO account (such as by linking their two accounts) can unlock new features within the third party website game, such as new species of animals or new characters to play. By using these methods, a link is created between two games that can be played independently but are more "complete" when played together.

At 220, the operation determines whether the mobile device is connected to the network (e.g., logged onto the website). If not logged on, then at 230, the points are saved locally on the mobile device. The points are saved through the use of encryption to secure the points. For instance, the encryption scheme that is built into the version of the subject mobile device may be employed. By way of example, if the user is playing the game on the iPhone®, the iPhone® encryption system can be used when saving the points. Alternatively, the game software may provide an additional or alternative encryption technique including a hash associated with the saved points, where the hash can be verified by the website 100 as properly representing the points that have been saved.

The encryption electronically verifies that the value indicative of the saved points has not been modified by a user or other machine. Encryption 230 therefore minimizes the chances that a user can hack the system.

Figure 3F:
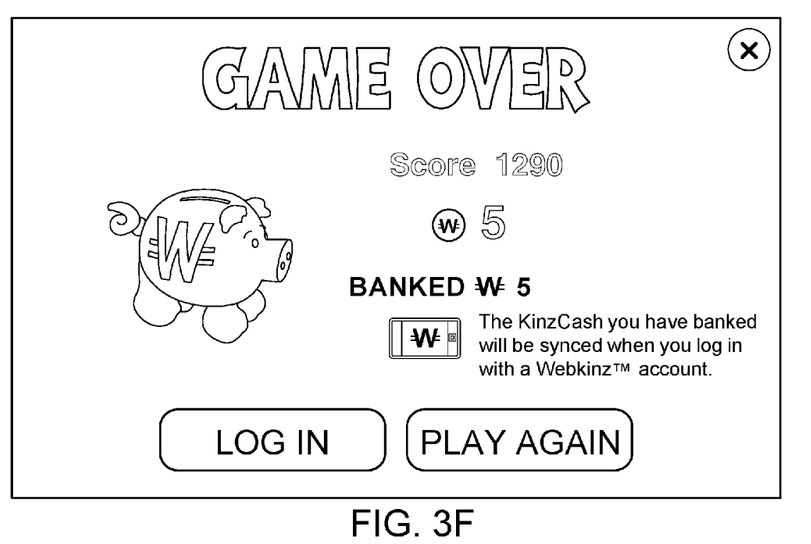
Figure 3G:
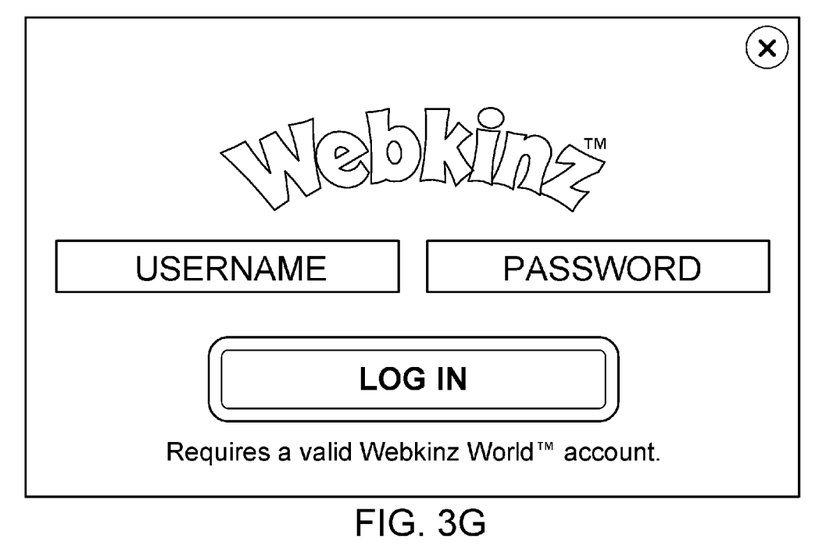
Figure 3H:
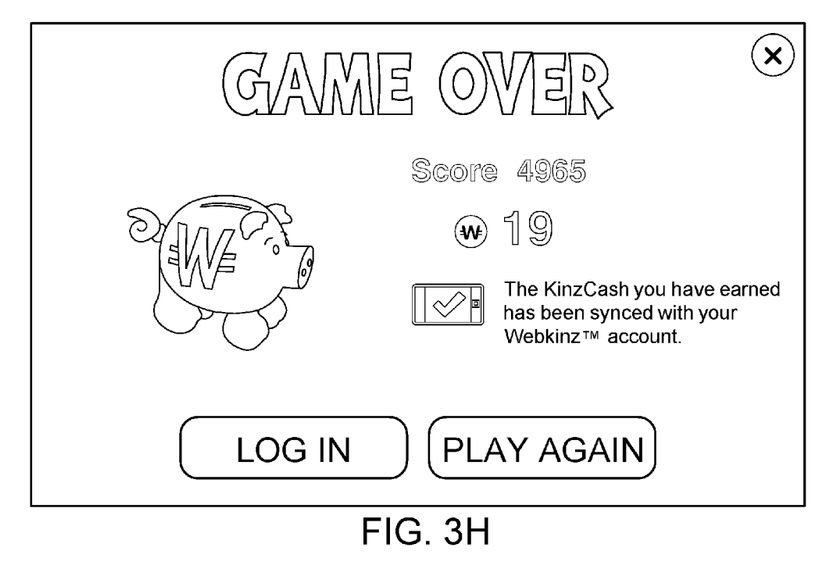

Returning to the example of FIGS. 3A-3H, after the user has finished playing the game—if the mobile device is not connected and/or the game is not logged into the user's Webkinz® account, then the screen shown in FIG. 3F is displayed. At this point, the virtual currency is banked on the mobile device and the user has the option of either logging in to a Webkinz® account by pressing "LOG IN" to sync the virtual currency or to keep the virtual currency banked. Upon clicking "LOG IN" the user is shown the log in screen of FIG. 3G, which requests a username and password to be entered. Upon entering the requested information and clicking "LOG IN" again, the game contacts the Webkinz server over an available Internet connection and synchronizes the banked virtual currency to the designated Webkinz® account, and then the confirmation screen of FIG. 3G is displayed.

In another embodiment, the number of points which can be saved locally may be limited, for example, to an amount which is reasonable for the user to have accumulated during a reasonable time away from the website. For instance, the point values may be limited to a maximum reasonable number that a user can accumulate in 6 hours of playing. In this way, even if the user does succeed in hacking the scoring, they cannot enter more points than is otherwise considered reasonable on a per day basis. Other time frames are contemplated as well and are intended to be included.

If the device's system is found to be connected to the network and logged onto the website at 220, a determination is made at 240 of whether there are any stored points previously saved on the device. If so, then at 250, those previously stored points are checked to determine if such points are correct and un-tampered with (e.g., valid), and the points are then synced to the user's account on the website as shown, for example, in FIG. 3H. Control then returns to 210 where game-playing can be continued. It should be appreciated that if the device is connected to the network but not logged onto the game's primary website via the user's account, then the user is given an opportunity to log on (see, e.g. FIG. 3G) to the website in order to sync the points which have been earned on the third party game (e.g., online website or offline and stored locally on mobile device) to their account on the game's primary website (Ganz®).

If there are no previously stored points at 240, the just-earned points are updated on the game's primary website at 260. This is the mode in which the website points are kept track of live and in real-time on the game's primary website.

At 270, the encryption is updated as necessary. For example, the encryption key may be updated periodically in order to avoid or minimize the chances of hacking.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example the above has described this system being operated as an iPhone® or Android app, however it should be understood that this can be operated on any mobile device. For example, this can be operated as an off-line application on a laptop or tablet computer without an active connection to the Internet.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPM"), and the like.

A computer system used according to the present application preferably includes a main memory and may also include a secondary memory. The main memory provides storage of instructions and data for programs executing on the processor. The main memory is typically semiconductor-based memory su.ch as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wi-Fi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer or operated locally, e.g., by being downloaded to the client computer, or operated via a server farm. The web site can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer program product, comprising a computer usable non transitory tangible medium having a computer readable program code embodied therein, said computer readable program code executed to carry out a computer based activity, comprising:
    detecting actions on a user interface of a programmed computer, said actions comprising interaction with a computer based activity on the programmed computer and said interaction on the programmed computer including earning points in the activity for taking said actions;
    determining, in the programmed computer, if the programmed computer is currently communicating to a remote website;
    where, said computer based activity being one which is carried out on a client, and where said client can carry out said activity either connected to or disconnected from said remote website;
    at a first time, when said determining determines that the programmed computer is connected to the remote website, then communicating said points to said remote website as said points are obtained;
    at a second time, when said determining determines that the programmed computer is not communicating to the remote website, then storing said points in a local memory in the programmed computer, said storing including storing an encryption result that is usable by the remote website to verify that said points were properly stored by carrying out the computer based activity; and
    at a third time, which is a time subsequent to a time when first points have been earned from said computer-based activity and stored in said local memory, when said determining determines that the programmed computer is communicating to the remote website, then verifying the encryption result to determine that said first points were properly stored, and only if the encryption result indicates that the first points were properly stored, then communicating said first points to said remote website.

2. A computer program product as in claim 1, wherein said computer based activity is a game.

3. A computer program product as in claim 1, wherein said computer based activity is carried out by displaying a virtual product that has been previously registered by the user.

4. A computer program product as in claim 3, wherein said computer based activity is carried out by displaying a virtual product that has been customized by the user.

5. A computer program product as in claim 4, wherein said points which are obtained by playing said game are used to customize said virtual product.

6. A computer program product as in claim 5, further comprising animating said virtual product in the activity.

7. A computer program product as in claim 1, further comprising detecting a connection to a network, and automatically detecting if there are previously stored points on the programmed computer, and automatically detecting information about an encryption of said encryption result storing said previously stored points.

8. A product as in claim 7, further comprising periodically updating a key used for the encryption.

9. A computer program product, comprising a computer usable non transitory tangible medium having a computer readable program code embodied therein, said computer readable program code executed to carry out a computer based activity, comprising:

detecting actions on a user interface of a programmed computer, said actions comprising interaction with a computer based activity on the programmed computer involving playing a first game;

first earning first items in the activity for taking said actions in said first game via a website version of said first game;

second taking actions in said first game via a primary version of said first game that is not being played via said website version; and earning second items for said second taking actions, where said second items are not available to said website version; and detecting, during said first earning, that said user has been connected to said primary version of said first game, and providing additional activities during said primary version of said first game.

10. A product as in claim 9 where, said computer based activity being one which is carried out on a remote client, either connected to or disconnected from a user account corresponding to said primary version, at a first time, determining that the programmed computer is connected to said user account, then communicating said points to said user account as said points are obtained via the website version; and at a second time, when said determining determines that the programmed computer is not connected to said user account, then storing said points in a local memory in the programmed computer, said storing including storing an encryption result that is usable by the website version to verify that said points were properly stored by carrying out the computer based activity.

* * * * *